US011930745B1

(12) United States Patent
Tucker

(10) Patent No.: US 11,930,745 B1
(45) Date of Patent: Mar. 19, 2024

(54) Y-SHAPED PLATE CANNABIS DE-BUDDING MACHINE

(71) Applicant: Gerald Tucker, Fredricton (CA)

(72) Inventor: Gerald Tucker, Fredricton (CA)

( * ) Notice: Subject to any disclaimer, the term of this patent is extended or adjusted under 35 U.S.C. 154(b) by 217 days.

(21) Appl. No.: 17/550,052

(22) Filed: Dec. 14, 2021

(51) Int. Cl.
*A01G 3/00* (2006.01)

(52) U.S. Cl.
CPC .......... *A01G 3/00* (2013.01); *A01G 2003/005* (2013.01)

(58) Field of Classification Search
CPC .............................. A01G 3/00; A01G 2003/005
See application file for complete search history.

(56) References Cited

U.S. PATENT DOCUMENTS

| | | | | |
|---|---|---|---|---|
| 1,650,521 | A * | 11/1927 | Johnson | A01D 45/003 56/59 |
| 2,039,085 | A * | 4/1936 | Kinker, Jr. | A24B 5/06 131/321 |
| 4,773,434 | A * | 9/1988 | Miyake | A01D 45/16 131/319 |
| 7,909,687 | B2 | 3/2011 | Al-Harbi | |
| 8,753,180 | B2 * | 6/2014 | Hutchins | A01D 45/16 460/134 |
| 8,757,524 | B2 | 6/2014 | Mosman | |
| D795,316 | S | 8/2017 | Raichart | |
| 9,832,937 | B2 | 12/2017 | Schroeder | |
| 10,334,785 | B2 * | 7/2019 | Wieker | A01D 45/065 |
| 10,792,830 | B2 | 10/2020 | Raichart | |
| 10,888,052 | B2 | 1/2021 | Atteberry | |
| 10,925,213 | B1 * | 2/2021 | Cohen | A01D 45/16 |
| 10,966,373 | B1 * | 4/2021 | Kaleck | A01G 7/00 |
| 2007/0271896 | A1 | 11/2007 | Bonny | |
| 2016/0374386 | A1 * | 12/2016 | Desmarais | A01D 46/02 460/137 |
| 2018/0077866 | A1 * | 3/2018 | Perez | A01D 43/086 |
| 2019/0274248 | A1 * | 9/2019 | Mosman | A01D 46/00 |
| 2021/0237093 | A1 * | 8/2021 | Archie | B02C 4/08 |
| 2021/0291192 | A1 * | 9/2021 | Kolbet | A01G 3/00 |
| 2022/0250083 | A1 * | 8/2022 | Cantrell | A23N 15/02 |

FOREIGN PATENT DOCUMENTS

| | | |
|---|---|---|
| CA | 2775457 | 11/2012 |
| FR | 1063624 A * | 5/1954 |

* cited by examiner

*Primary Examiner* — Jessica B Wong
(74) *Attorney, Agent, or Firm* — Kyle A. Fletcher, Esq.

(57) ABSTRACT

The cannabis de-budding machine comprises a vertical plate, a roller, and a motor. The cannabis de-budding machine may be operable to separate a stem of a cannabis plant from flowers, buds, and leaves by pulling the stem through a stem slot located on the vertical plate. The roller may be adapted to assist in pulling the stem through the vertical plate when the roller is rotated by the motor. The stem may be pulled through the stem slot to a near side of the vertical plate leaving the flowers, buds, and leaves on a far side of the vertical plate.

19 Claims, 4 Drawing Sheets

Y-SHAPED PLATE CANNABIS DE-BUDDING MACHINE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of cannabis processing, more specifically, a cannabis de-budding machine.

SUMMARY OF INVENTION

The cannabis de-budding machine comprises a vertical plate, a roller, and a motor. The cannabis de-budding machine may be operable to separate a stem of a cannabis plant from flowers, buds, and leaves by pulling the stem through a stem slot located on the vertical plate. The roller may be adapted to assist in pulling the stem through the vertical plate when the roller is rotated by the motor. The stem may be pulled through the stem slot to a near side of the vertical plate leaving the flowers, buds, and leaves on a far side of the vertical plate.

An object of the invention is to separate a stem of a cannabis plant from flowers, buds and leaves.

Another object of the invention is to provide a vertical plate comprising a Y-shaped notch and a stem slot through which the cannabis plant may be pulled to separate the stem from the rest of the plant.

A further object of the invention is to provide a motorized roller to assist in pulling the stem through the stem slot.

Yet another object of the invention is to provide bevel edges on the sides of the stem slot to reduce the probability of the stem tearing while being pulled.

These together with additional objects, features and advantages of the cannabis de-budding machine will be readily apparent to those of ordinary skill in the art upon reading the following detailed description of the presently preferred, but nonetheless illustrative, embodiments when taken in conjunction with the accompanying drawings.

In this respect, before explaining the current embodiments of the cannabis de-budding machine in detail, it is to be understood that the cannabis de-budding machine is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the cannabis de-budding machine.

It is therefore important that the claims be regarded as including such equivalent construction insofar as they do not depart from the spirit and scope of the cannabis de-budding machine. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
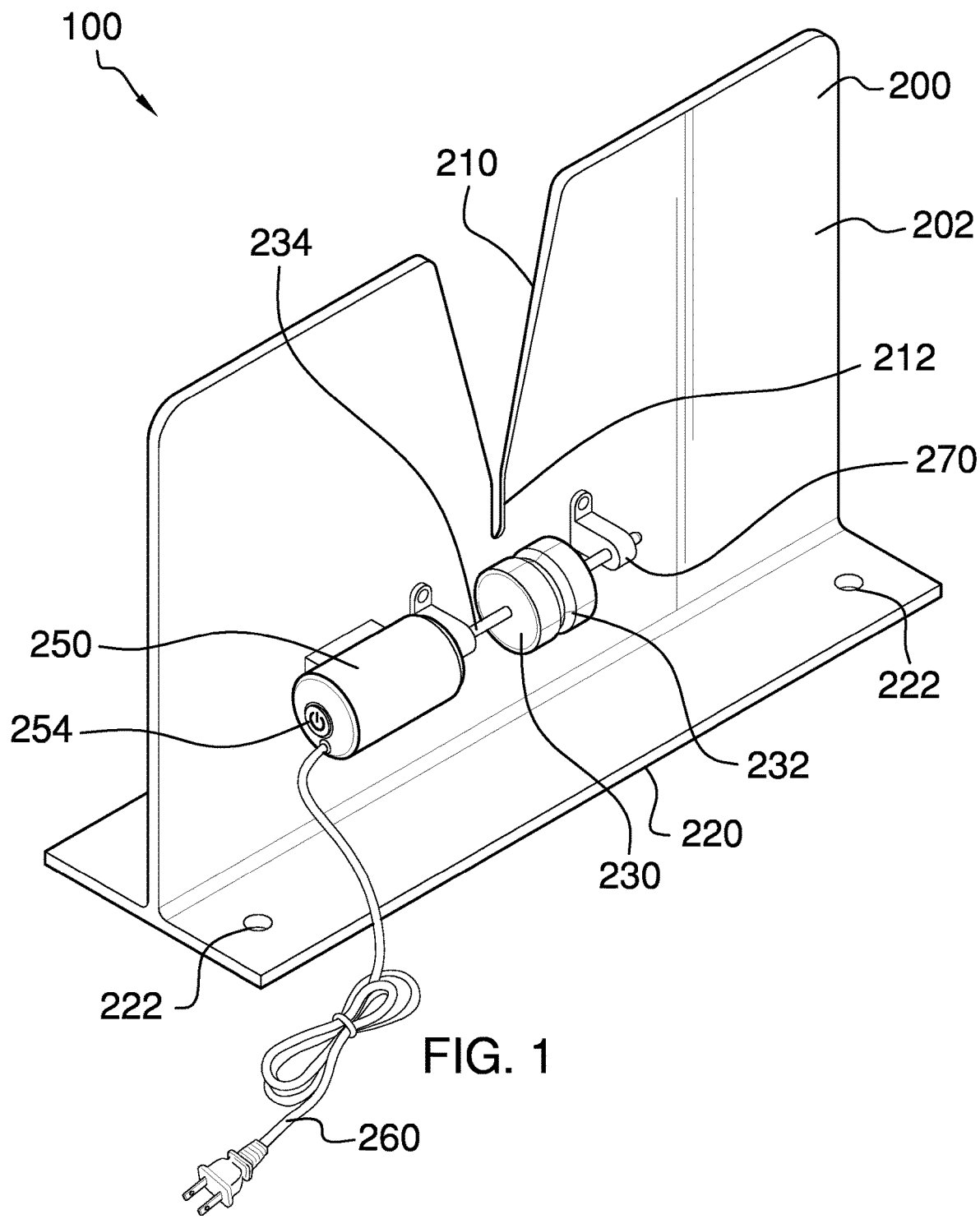
FIG. 1 is an isometric view of an embodiment of the disclosure.
Figure 2:
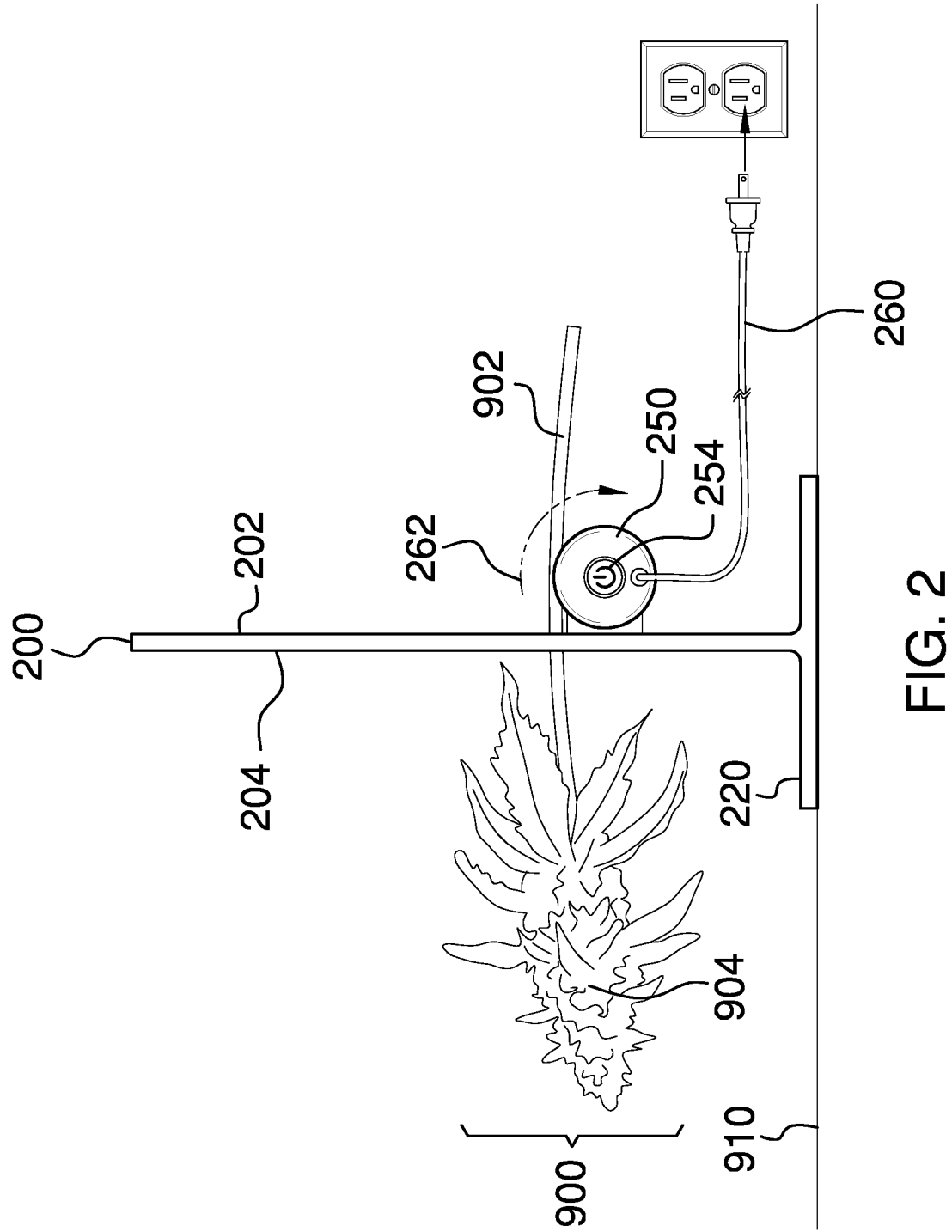
FIG. 2 is a side view of an embodiment of the disclosure.
Figure 3:
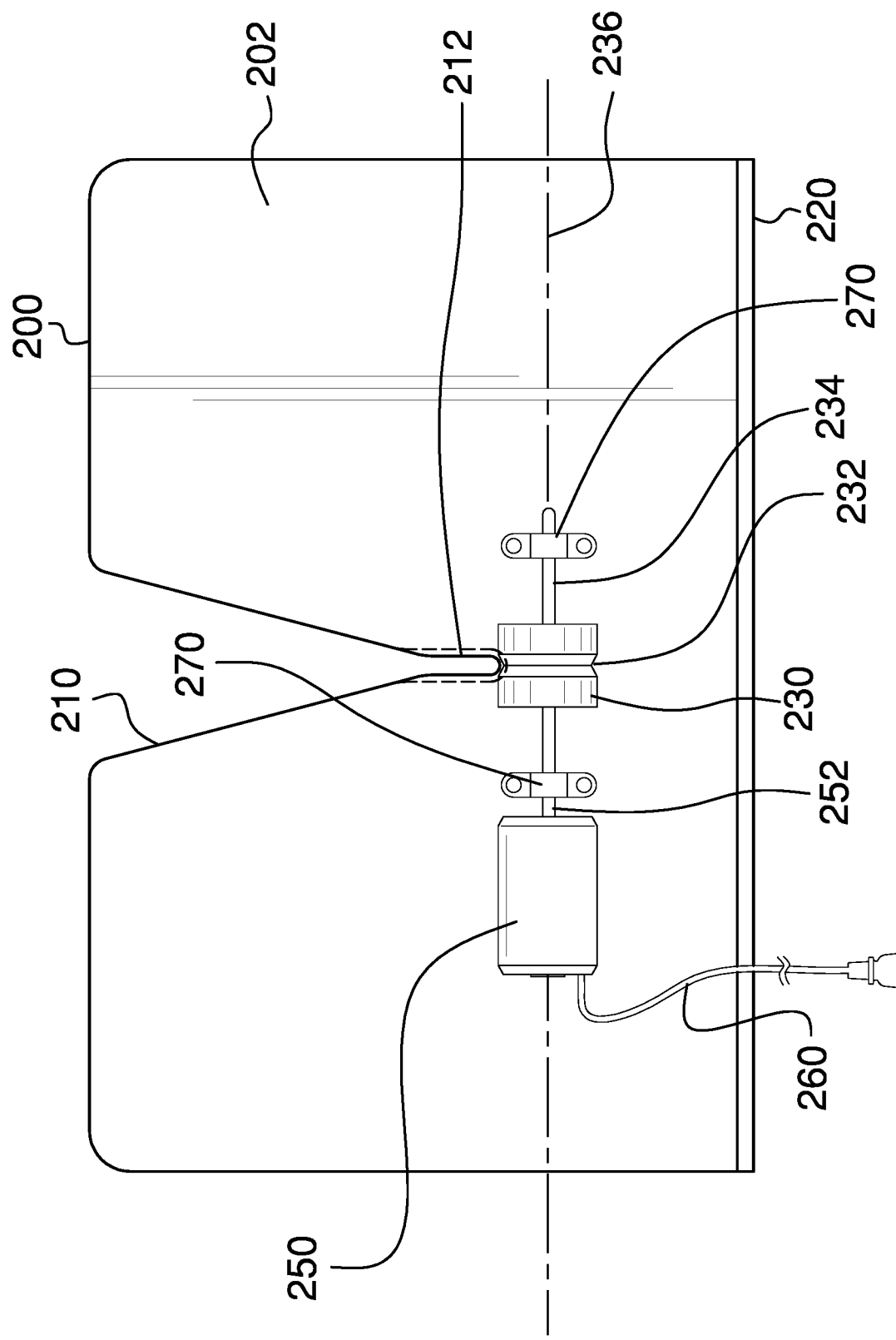
FIG. 3 is a near side view of an embodiment of the disclosure.
Figure 4:
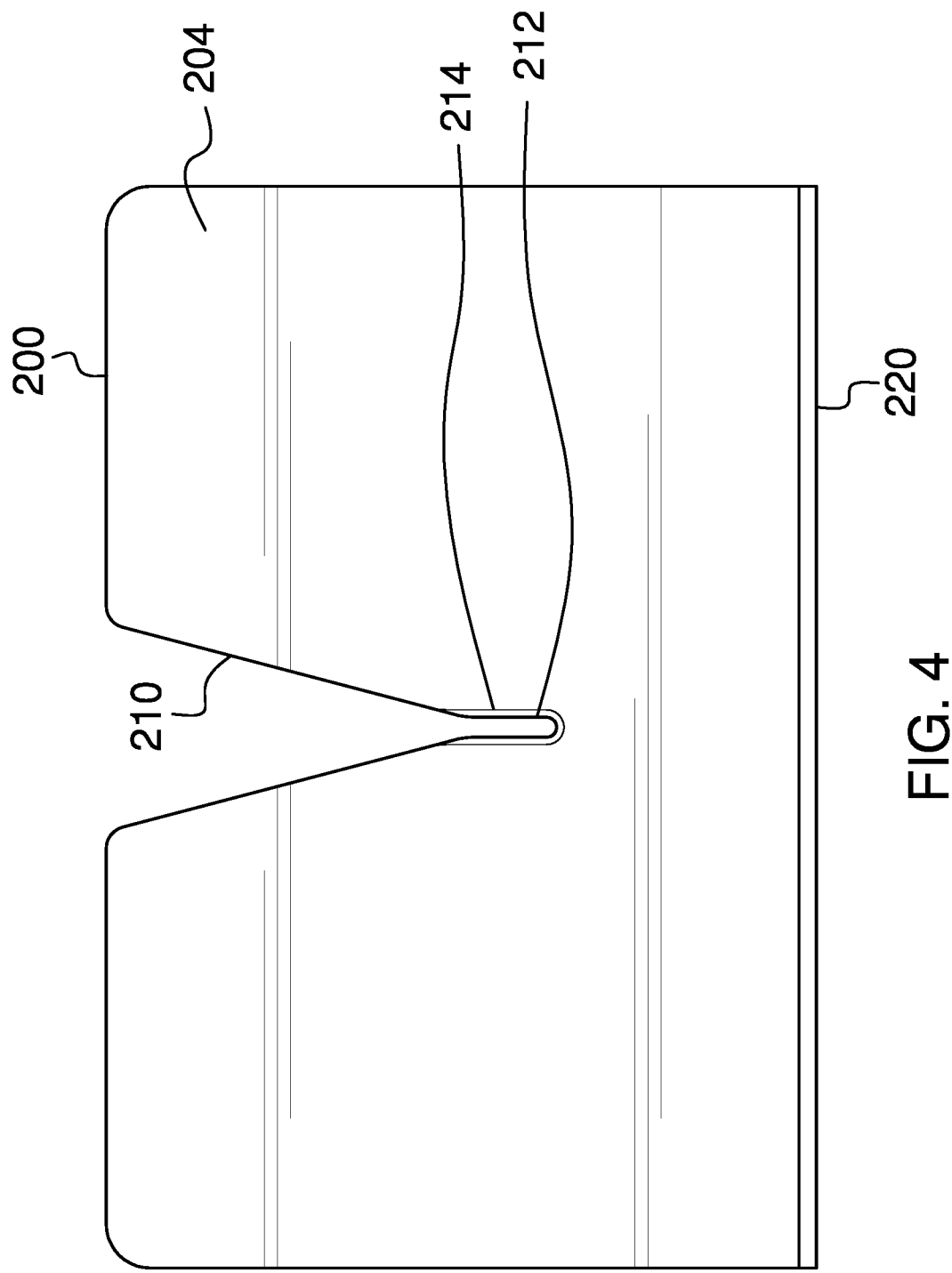
FIG. 4 is a far side view of an embodiment of the disclosure.

Detailed reference will now be made to a first potential embodiment of the disclosure, which is illustrated in FIGS. 1 through 4.

The cannabis de-budding machine 100 (hereinafter invention) comprises a vertical plate 200, a roller 230, and a motor 250. The invention 100 may be operable to separate a stem 902 of a cannabis plant 900 from flowers, buds, and leaves 904 by pulling the stem 902 through a stem slot 212 located on the vertical plate 200. The roller 230 may be adapted to pull the stem 902 through the vertical plate 200 when the roller 230 is rotated by the motor 250. The stem 902 may be pulled through the stem slot 212 to a near side 202 of the vertical plate 200 leaving the flowers, buds, and leaves 904 on a far side 204 of the vertical plate 200.

The vertical plate 200 may be a vertically-oriented panel that defines the near side 202 and the far side 204. The near side 202 of the vertical plate 200 may be adapted to face an operator and the far side 204 of the vertical plate 200 may be opposite the near side 202. In a preferred embodiment, the vertical plate 200 may be made of stainless steel.

The vertical plate 200 may comprise a Y-shaped notch 210 that is located at the lateral center of the vertical plate 200. The bottom of the Y-shaped notch 210 may comprise the stem slot 212. The Y-shaped notch 210 may be wider at the top of the vertical plate 200 than the width of the stem slot 212 to guide the stem 902 into the stem slot 212 as the stem 902 is lowered into the Y-shaped notch 210. The Y-shaped notch 210 may extend downwards from the top of the vertical plate 200 to a depth of between ⅓ and ⅔ the height of the vertical plate 200. The Y-shaped notch 210 may be open at the top such that the stem 902 may be lowered into the Y-shaped notch 210 from above with the flowers, buds, and leaves 904 on the far side 204 of the vertical plate 200 and the stem 902 extending to the near side 202 of the vertical plate 200.

The stem slot 212 may comprise vertical, parallel sides. The width of the stem slot 212 may permit the stem 902 to pass through the stem slot 212 but may block the flowers, buds, and leaves 904 from passing through the stem slot 212. The stem slot 212 may comprise beveled edges 214 on the far side 204 of the vertical plate 200 such that as the stem 902 is pulled through the stem slot 212 from the far side 204 to the near side 202, the stem 902 may encounter a narrowing of the stem slot 212.

A base plate 220 may be a horizontally-oriented panel that is coupled to the bottom edge of the vertical plate 200 perpendicular to the vertical plate 200. The base plate 220 may be operable as a support for the vertical plate 200. The base plate 220 may be mounted to a work surface 910 via one or more mounting apertures 222 to hold the invention 100 in place on the work surface 910.

The roller 230 may be operable to pull the stem 902 through the stem slot 212. The roller 230 may be cylindrically shaped. A central axis 236 of the roller 230 may be oriented horizontally and parallel to the vertical plate 200. The roller 230 may be located on the near side 202 of the vertical plate 200 adjacent to the stem slot 212 such that a V-shaped notch 232 of the roller 230 aligns with the bottom of the stem slot 212. The roller 230 may be coupled to a roller axle 234 that is turned when the motor 250 is energized. A direction of rotation 262 of the roller 230 may be such that the top of the roller 230 moves away from the vertical plate 200 and the bottom of the roller 230 moves towards the vertical plate 200.

The V-shaped notch 232 may be adapted to grip the stem 902 and to assist in pulling the stem 902 through the stem slot 212. The V-shaped notch 232 may be located at the center of the roller 230 and may encircle the roller 230. The V-shaped notch 232 may lie in a plane that is perpendicular to the central axis 236 of the roller 230.

As a non-limiting example, the roller 230 may be adapted to assist in pulling the stem 902 through the stem slot 212 when the operator drops the stem 902 into the bottom of the stem slot 212 from the top of the Y-shaped notch 210, pulls the stem 902 towards the operator, and pulls the stem 902 downwards such that the stem 902 bends around the roller 230. The operator may exert a force to pull the stem 902 through the stem slot 212 and the roller 230 may assist by pulling the stem 902 horizontally using the top of the roller 230 and then vertically using the side of the roller 230 that is nearest to the operator.

In some embodiments, the roller 230 may be made of rubber. In some embodiments, the roller 230 may be made of steel. In some embodiments, the roller 230 may comprise a textured surface to increase friction between the roller 230 and the stem 902 such that the roller 230 may grip the stem 902 tighter.

The motor 250 may convert electrical energy into mechanical energy. The motor 250 may cause rotational motion of the roller axle 234 when the electrical energy is applied to the motor 250. The electrical energy applied to the motor 250 may be controlled by an ON/OFF control 254. The motor 250 may comprise a shaft 252 that rotates when the motor 250 is energized. The shaft 252 may be coupled to the roller axle 234 such that energization of the motor 250 causes rotation of the roller 230.

The ON/OFF control 254 may energize the motor 250 when the ON/OFF control 254 is in an ON position and completes a circuit from a power cord 260 to the motor 250. The ON/OFF control 254 may deenergize the motor 250 when the ON/OFF control 254 is in an OFF position and breaks the circuit from the power cord 260 to the motor 250.

As a non-limiting example, the ON/OFF control 254 may be a momentary pushbutton which requires constant depression while operating the invention 100 and which will deenergize the motor 250 if released. In some embodiments, the invention 100 may utilize an electric eye which may be mounted under the roller 230. If the stem 902 begins to wrap around the roller 230, the stem 902 may break a light beam and the electric eye may sense the stem 902 wrapping around the roller 230 and may deenergize the motor 250 until the stem 902 is cleared.

As non-limiting examples, the roller 230, the roller axle 234, the motor 250, the ON/OFF control 254, or combinations thereof may be coupled to the vertical plate 200 in the correct positions and orientations by mounting hardware 270.

In use, the operator may mount the base plate 220 to the work surface 910 in order to orient and stabilize the vertical plate 200. The operator may activate the ON/OFF control 254 to energize the motor 250. The operator may lower the stem 902 of the cannabis plant 900 into the Y-shaped notch 210 with the stem 902 passing through the stem slot 212 to the near side 202 and the flowers, buds, and leaves 904 located on the far side 204 of the vertical plate 200. The operator may pull the stem 902 towards the near side 202 of the vertical plate 200 and downwards past the far side 204 of the roller 230 such that the stem 902 may be gripped by the V-shaped notch 232 of the roller 230. The operator and the roller 230 may work together to pull the stem 902 through the stem slot 212 which may separate the stem 902 from the flowers, buds, and leaves 904. The stem 902 may pass through the stem slot 212 to the near side 202 of the vertical plate 200 and the flowers, buds, and leaves 904 may fall to the work surface 910 on the far side 204 of the vertical plate 200. The stems 902 may be discarded and the flowers, buds, and leaves 904 may be collected for further processing.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used in this disclosure, an "aperture" may be an opening in a surface. Aperture may be synonymous with hole, slit, crack, gap, slot, or opening.

As used in this disclosure, an "axle" may be a cylindrical shaft or rod that is inserted through the center of an object such that the center axis of the object and the center axis of the axle are aligned and the object can rotate using the axle as an axis of rotation.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw. In some embodiments, a control may alter an electrical property of a circuit such as resistance, inductance, or capacitance.

As used herein, the words "couple", "couples", "coupled" or "coupling", may refer to connecting, either directly or indirectly, and does not necessarily imply a mechanical connection.

As used herein, "energize" and/or "energization" may refer to the application of an electrical potential to a system or subsystem.

As used in this disclosure, "horizontal" may be a directional term that refers to a direction that is perpendicular to the local force of gravity. Unless specifically noted in this disclosure, the horizontal direction is always perpendicular to the vertical direction.

As used in this disclosure, the word "lateral" may refer to the sides of an object or movement towards a side. Lateral directions are generally perpendicular to longitudinal directions. "Laterally" may refer to movement in a lateral direction.

As used in this disclosure, a "motor" may refer to a device that transforms energy from an external power source into mechanical energy.

As used herein, "mounting hardware" may refer to mechanical devices that are used to attach one object to another, including devices whose only purpose is to improve aesthetics. As non-limiting examples, mounting hardware may include screws, nuts, bolts, washers, rivets, crossbars, hooks, collars, nipples, cams, standoffs, knobs, caps, plates, rails, lips, and brackets.

As used in this disclosure, a "notch" may be an indentation formed in an edge or a cavity or aperture formed within a surface.

As used in this disclosure, a "plate" may be a flat, rigid object having at least one dimension that is of uniform thickness and is thinner than the other dimensions of the object. Plates often have a rectangular or disk like appearance. Plates may be made of any material, but are commonly made of metal.

As used in this disclosure, a "slot" may be a long narrow groove, cut, opening, or aperture that is formed in or through an object.

As used in this disclosure, "vertical" may refer to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claimed is:

1. A cannabis de-budding machine comprising:
a vertical plate, a roller, and a motor;
wherein the cannabis de-budding machine is operable to separate a stem of a cannabis plant from flowers, buds, and leaves by pulling the stem through a stem slot located on the vertical plate;
wherein the roller is adapted to pull the stem through the vertical plate when the roller is rotated by the motor;
wherein the stem is pulled through the stem slot to a near side of the vertical plate leaving the flowers, buds, and leaves on a far side of the vertical plate;
wherein a central axis of the roller is oriented horizontally and parallel to the vertical plate;
wherein the roller is located on the near side of the vertical plate adjacent to the stem slot such that a V-shaped notch of the roller aligns with a bottom of the stem slot;
wherein the V-shaped notch is adapted to grip the stem and to assist in pulling the stem through the stem slot;
wherein the V-shaped notch is located at a center of the roller and encircles the roller;
wherein the V-shaped notch lies in a plane that is perpendicular to the central axis of the roller.

2. The cannabis de-budding machine according to claim 1 wherein the vertical plate is a vertically-oriented panel that defines the near side and the far side;
wherein the near side of the vertical plate is adapted to face an operator and the far side of the vertical plate is opposite the near side.

3. The cannabis de-budding machine according to claim 2 wherein the vertical plate is made of stainless steel.

4. The cannabis de-budding machine according to claim 2 wherein the vertical plate comprises a Y-shaped notch that is located at the lateral center of the vertical plate;
wherein the bottom of the Y-shaped notch comprises the stem slot.

5. The cannabis de-budding machine according to claim 4 wherein the Y-shaped notch is wider at the top of the vertical plate than the width of the stem slot to guide the stem into the stem slot as the stem is lowered into the Y-shaped notch.

6. The cannabis de-budding machine according to claim 5 wherein the Y-shaped notch extends downwards from the top of the vertical plate to a depth of between ⅓ and ⅔ the height of the vertical plate.

7. The cannabis de-budding machine according to claim 6 wherein the Y-shaped notch is open at the top such that the stem is lowered into the Y-shaped notch from above with the flowers, buds, and leaves on the far side of the vertical plate and the stem extending to the near side of the vertical plate.

8. The cannabis de-budding machine according to claim 7 wherein the stem slot comprises vertical, parallel sides;
wherein the width of the stem slot permits the stem to pass through the stem slot but blocks the flowers, buds, and leaves from passing through the stem slot;
wherein the stem slot comprises beveled edges on the far side of the vertical plate such that as the stem is pulled through the stem slot from the far side to the near side, the stem encounters a narrowing of the stem slot.

9. The cannabis de-budding machine according to claim 8 wherein a base plate is a horizontally-oriented panel that is coupled to the bottom edge of the vertical plate perpendicular to the vertical plate;

wherein the base plate is operable as a support for the vertical plate;

wherein the base plate is mountable on a work surface via one or more mounting apertures to hold the cannabis de-budding machine in place on the work surface.

10. The cannabis de-budding machine according to claim 9 wherein the roller is operable to pull the stem through the stem slot;

wherein the roller is cylindrically shaped.

11. The cannabis de-budding machine according to claim 10 wherein the roller is coupled to a roller axle that is turned when the motor is energized;

wherein a direction of rotation of the roller is such that the top of the roller moves away from the vertical plate and the bottom of the roller moves towards the vertical plate.

12. The cannabis de-budding machine according to claim 11 wherein the roller is adapted to assist in pulling the stem through the stem slot when the operator drops the stem into the bottom of the stem slot from the top of the Y-shaped notch, pulls the stem towards the operator, and pulls the stem downwards such that the stem bends around the roller.

13. The cannabis de-budding machine according to claim 12 wherein the roller is made of rubber.

14. The cannabis de-budding machine according to claim 12 wherein the roller is made of steel.

15. The cannabis de-budding machine according to claim 12 wherein the roller comprises a textured surface to increase friction between the roller and the stem such that the roller grips the stem tighter.

16. The cannabis de-budding machine according to claim 12 wherein the motor converts electrical energy into mechanical energy;

wherein the motor causes rotational motion of the roller axle when the electrical energy is applied to the motor;

wherein the electrical energy applied to the motor is controlled by an ON/OFF control;

wherein the motor comprises a shaft that rotates when the motor is energized;

wherein the shaft is coupled to the roller axle such that energization of the motor causes rotation of the roller.

17. The cannabis de-budding machine according to claim 16 wherein the ON/OFF control energizes the motor when the ON/OFF control is in an ON position and completes a circuit from a power cord to the motor;

wherein the ON/OFF control deenergizes the motor when the ON/OFF control is in an OFF position and breaks the circuit from the power cord to the motor.

18. The cannabis de-budding machine according to claim 17 wherein the ON/OFF control is a momentary pushbutton which requires constant depression while operating the cannabis de-budding machine and which will deenergize the motor if released.

19. The cannabis de-budding machine according to claim 17 wherein the roller, the roller axle, the motor, the ON/OFF control, or combinations thereof are coupled to the vertical plate by mounting hardware.

* * * * *